(12) United States Patent
Ueta et al.

(10) Patent No.: US 7,909,337 B2
(45) Date of Patent: Mar. 22, 2011

(54) GASKET

(75) Inventors: Kosaku Ueta, Ohsato-gun (JP); Nobuhide Kobayashi, Kawagoe (JP)

(73) Assignee: Japan Metal Gasket Co., Ltd., Saitama (JP)

(*) Notice: Subject to any disclaimer, the term of this patent is extended or adjusted under 35 U.S.C. 154(b) by 94 days.

(21) Appl. No.: 11/497,048

(22) Filed: Aug. 1, 2006

(65) Prior Publication Data

US 2007/0090607 A1    Apr. 26, 2007

(30) Foreign Application Priority Data

Oct. 24, 2005 (JP) ................................. 2005-308372
Dec. 12, 2005 (JP) ................................. 2005-357699

(51) Int. Cl.
*F02F 11/00* (2006.01)
(52) U.S. Cl. .................... 277/593; 277/594; 277/595
(58) Field of Classification Search ........... 277/592–595
See application file for complete search history.

(56) References Cited

U.S. PATENT DOCUMENTS

| | | | |
|---|---|---|---|
| 4,938,488 A * | 7/1990 | Udagawa et al. ............. | 277/595 |
| 5,087,058 A * | 2/1992 | Miura et al. .................. | 277/595 |
| 5,536,024 A | 7/1996 | Udagawa .................. | 277/235 B |
| 5,713,580 A * | 2/1998 | Ueta ............................ | 277/593 |
| 6,250,644 B1 * | 6/2001 | Diez et al. ..................... | 277/595 |
| 6,431,554 B1 | 8/2002 | Miyamoto et al. | |
| 6,457,724 B2 * | 10/2002 | Ogaeri et al. ................ | 277/595 |
| 7,000,924 B2 * | 2/2006 | Hohe et al. ................... | 277/593 |
| 2002/0180161 A1 | 12/2002 | Werz et al. .................... | 277/594 |
| 2003/0042689 A1 | 3/2003 | Diez et al. ..................... | 277/593 |

FOREIGN PATENT DOCUMENTS

| | | |
|---|---|---|
| DE | 10005455 A1 * | 10/2001 |
| DE | 10 2004 01172 A1 | 10/2005 |
| DE | 102004011721 | 10/2005 |
| JP | 07041139 | 7/1995 |
| JP | 8-100859 A | 4/1996 |
| JP | 11-108191 A | 4/1999 |
| JP | 2000-227047 | 8/2000 |
| JP | 2002 005292 A | 1/2002 |
| JP | 2002-174142 A | 6/2002 |
| JP | 2002174142 | 6/2002 |
| KR | 200176441 | 4/2000 |
| KR | 2020000176441 Y1 | 4/2000 |

OTHER PUBLICATIONS

European Search Report dated Mar. 26, 2007 from the corresponding European Patent Application No. EP06010376.9-1252.

(Continued)

*Primary Examiner* — Vishal Patel
(74) *Attorney, Agent, or Firm* — Young Basile

(57) ABSTRACT

A gasket which can uniformize the facial pressure on the thickened part more securely is to be provided. A gasket comprises a pair of base plates and stacked above and underneath, in which combustion chamber holes and bolt holes are bored, a doubling plate and shim plates intervene between these base plates. On this doubling plate, a second bead, which permits plastic deformation, extends in the circumferential direction of each combustion chamber hole. As the second bead is deformed according to the magnitude of the fastening load, the gasket height lowers where the fastening load is heavy and the facial pressure on the peripheries of combustion chamber holes is uniformized after fastening.

10 Claims, 6 Drawing Sheets

OTHER PUBLICATIONS

The Office Action dated Nov. 28, 2006 issued by the Korean Patent Office with an English Translation.

The second Chinese Office Action dated Oct. 31, 2008 issued by the Chinese Patent Office for the corresponding Chinese Patent Application No. 2006101149131.

Office Action dated Apr. 11, 2008 issued by Chinese Patent Office for Chines Patent Application No. 200610114913.1.

Office Action dated Dec. 21, 2010 issued by the Japan Patent Office for the corresponding Japanese Patent Application No. 2005-357699 and the English translation thereof.

* cited by examiner

GASKET

BACKGROUND OF THE INVENTION

Field of the Invention

The present invention relates to a gasket, and more particularly to a gasket which is to intervene between the joining faces of cylinder blocks and cylinder heads constituting an internal combustion engine for use in motorcycles, automobiles, industrial machinery, outboard motors and the like to seal the gap between those joining faces.

Laminated gaskets include, for instance, what is disclosed in JP12-227047A (hereinafter referred to as "Patent Document 1"). This gasket is designed to have a heavy/load work on the thickest portion disposed on the circumference of each combustion chamber hole, and the deformation of its cylinder head and the cylinder bore is prevented or restrained by reducing the plate thickness according to the required sealing performance. Thus, the gasket is so designed that its total plate thickness to be maximized on the circumference of each combustion chamber hole, reduced in the bead portion outside, and minimized in the portion farther outside. In this way, it is intended to secure the circularity of the cylinder bore and protect the cylinder head from being deformed by preventing an excessive facial pressure on the circumference immediately around the combustion chamber (bore) while enhancing the sealing performance. Patent Document 1 further discloses a technique by which the total plate thickness of the circumferences of the combustion chamber holes along the circumferential direction is varied to adjust the facial pressure on the circumference of the cylinder bore or to prevent the cylinder head from bending, thereby to secure the circularity of cylinder bore.

However, in order to varying the total plate thickness on the circumferences of the combustion chamber holes and obtain the intended level of facial pressure, trials should be made to find out the thickness, and since these are repetitive adjusting attempts, the efficiency of designing is poor. Furthermore, while the thickness of the doubling plate is partially varied by forging, this requires a sufficient accuracy of the metal mold, because a slight difference in doubling plate thickness would substantially affect the facial pressure. Moreover, for gaskets for a multi-cylinder engine, the area to be machined increases with the number of cylinders and requires a heavy load, the applicable production facility may be limited or machining may be made difficult.

An object of the present invention, attempted in view of these problems, is to provide a metal gasket which permits securing of the circularity of cylinder bores, prevents deformation of cylinder heads and ready setting of the desired facial pressure while stabilizing the facial pressure on the circumferences of the combustion chamber holes and raising the sealing pressure.

SUMMARY OF THE INVENTION

In order to solve the problems cited above, a gasket according to a first aspect of the invention is provided with a pair of base plates stacked one over the other, in each of which combustion chamber holes are bored and a first bead is disposed surrounding each of the combustion chamber holes, a doubling plate stacked between the pair of base plates, and shim plates stacked between the base plates and doubling plate and around the combustion chamber holes in the base plates; of each of the base plates, the flat part on the combustion chamber hole side relative to the position where the first bead is formed being called a first flat part and the flat part away from the combustion chamber hole relative to the first bead being called a second flat part, each of the shim plates is stacked at least over the first flat part of the base plate and the position where the first bead is formed, wherein a second bead, which is formed by bending in the direction of the plate thickness the doubling plate in the part thereof stacked over the first flat part and undergoes plastic deformation by a load in the direction of the plate thickness, is laid extending in the circumferential direction of each of the combustion chamber holes.

In the Claim corresponding to the foregoing paragraph, the phrase "the part thereof stacked over the first flat part" refers not only to direct stacking over the first flat part but also to stacking with a shim plate or the like in-between.

A gasket according to a second aspect of the invention is a version of the gasket according to the first aspect wherein the doubling plate is formed of a material less hard than that of the base-plates.

A gasket according to a third aspect of the invention is a version of the gasket according to the first or second aspect wherein at least the width or the height of the second bead is varied in the direction of the extension thereof.

A gasket according to a fourth aspect of the invention is a version of the gasket according to any one of the first through third aspects wherein bolt holes through which fastening bolts are inserted are formed in the base plates, and the second bead is not formed in the vicinities of the bolt holes but formed only in positions away from the bolt holes.

A gasket according to a fifth aspect of the invention is a version of the gasket according to any of the first through fourth aspects wherein two or more lines of the second beads are formed.

A gasket according to a sixth aspect of the invention is a version of the gasket according to any of the first through fifth aspects wherein the total plate thickness combining the thickness of the base plate, that of the doubling plate and that of the shim plate is maximized in the position of the first flat part in the area in which the shim plate is stacked.

A gasket according to a seventh aspect of the invention is a version of the gasket according to the sixth aspect wherein the total plate thickness is increased by stacking a plurality of the shim plates at least in the first flat part.

In the Claim corresponding to the foregoing paragraph, the phrase "at least in the first flat part" refers not only to cases in which a plurality of shim plates are stacked only to the first flat part but also to cases in which a plurality of shim plates are stacked elsewhere than the first flat part in addition to the first flat part.

Stacking of a plurality of shim plates refers only to folding back a single shim plate to create overlapping layers.

According to the invention, it is enabled to secure the circularity of cylinder bores, prevent deformation of cylinder heads and ready setting of the desired facial pressure while stabilizing the facial pressure on the circumferences of the combustion chamber holes and raising the sealing pressure.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENTS

Preferred embodiments of the present invention will be described below with reference to the accompanying drawings. (Configuration)

Figure 1A:
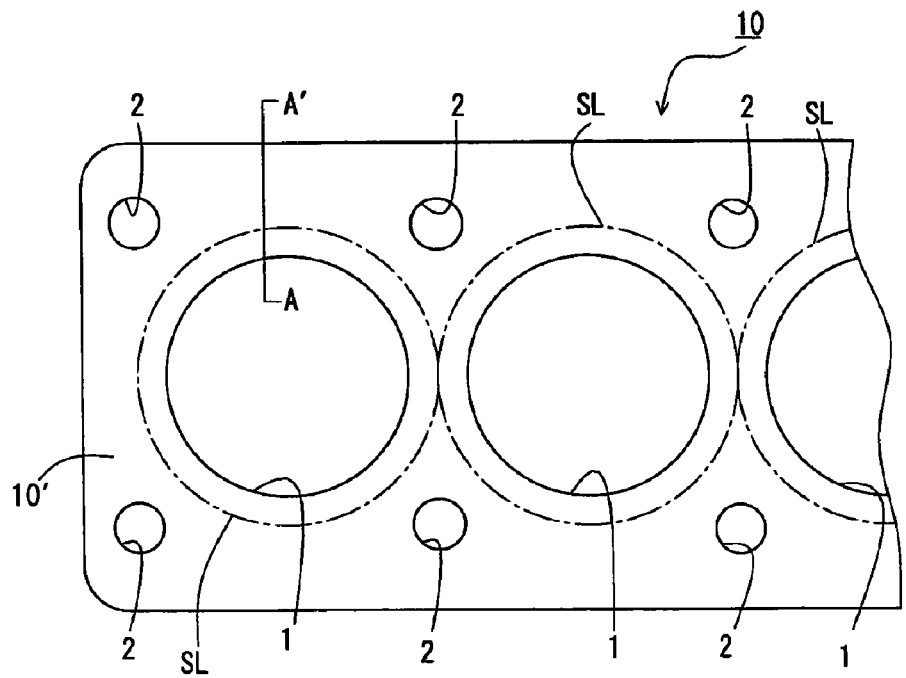
FIG. 1A shows a plan of a gasket embodying the present invention, and FIG. 1B, a plan of a doubling plate constituting part of the gasket.
Figure 1B:
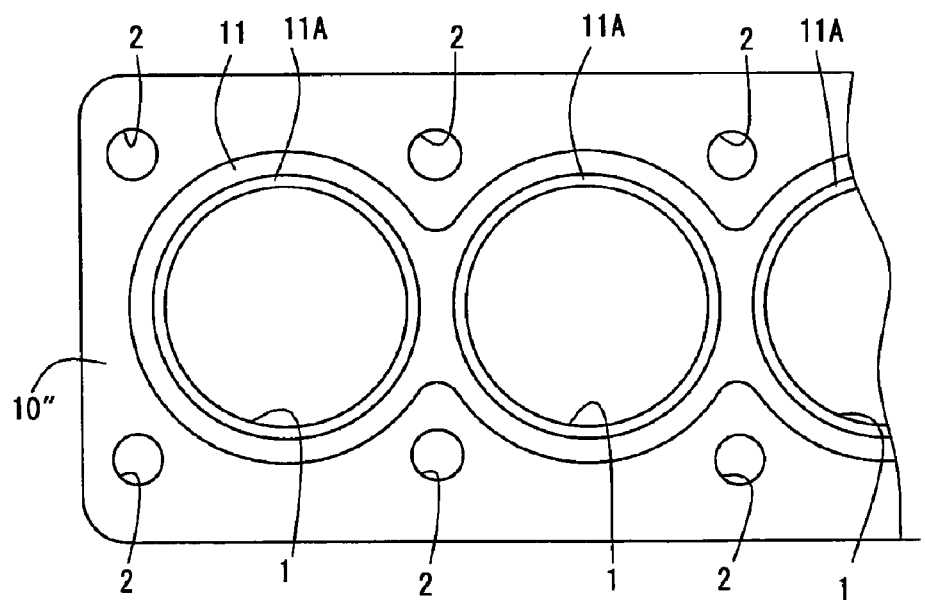
Figure 2:
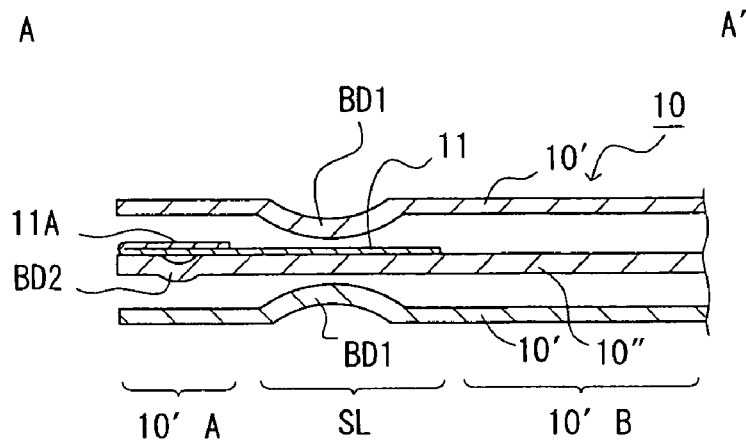
FIG. 2 shows a section along line A-A' in FIG. 1A.

A gasket according to an embodiment of the invention is shown in FIGS. 1A, 1B and FIG. 2. FIG. 1A shows a plan of a gasket 10 of this embodiment, and FIG. 1B, a plan of a doubling plate constituting part of the gasket shown in FIG. 1A. FIG. 2 shows a section along line A-A' in FIG. 1A.

The gasket 10 of this embodiment is one example of gasket which is to intervene between the joining faces of a cylinder head and a cylinder block of an internal combustion engine. This gasket 10 comprises base plates 10' and 10' stacked above and underneath, a doubling plate 10" stacked between these base plates 10' and 10', and shim plates 11 partly stacked between base plates 10' and 10' and the doubling plate 10". The configuration of each member will be described below.

Each of the base plates 10' is formed of a thin metal sheet. A preferable material is, for instance, a hard thin stainless steel sheet to enable a first bead BD1 (to be described afterwards) to generate by elasticity a sufficient facial pressure for sealing.

Combustion chamber holes 1 and bolt holes 2 are bored in the base plate 10'.

A plurality of combustion chamber holes 1 are arrayed in the lengthwise direction in the substantially central part of the base plate 10', formed in joining faces of the internal combustion engine, each a position matching a combustion chamber in which combustion gas is exploded. The bolt holes 2 are bored in positions where bolts for fastening the gasket 10 to cylinder blocks and cylinder heads are inserted.

A seal line SL is so set around each of the combustion chamber holes 1 as to surround the combustion chamber hole 1 and the first flat part 10'A (to be described below) in an endless ring shape, and the first bead BD1 is formed along that seal line SL. The first bead BD1 in this embodiment is a metal bead formed by so bending the base plate 10' as to be convex in one of the plate thickness directions. While the first bead BD1 is not restricted to any particular shape but can take one of many different shapes, it constitutes an arch-shaped full bead in FIG. 2. The bead height of the first bead BD1 is set to be higher than ½ of the plate thickness difference between the thickened part 11A (to be described below) and the flat part of the shim plate 11, and the required sealing pressure can be generated by elastic deformation to the gap height in the plate thickness direction formed by the thickened part 11A.

The pair of base plates 10' and 10' of the above-described configuration are symmetrically arranged between the upper and lower ones, namely so as to make the first bead BD1 face the doubling plate 10". The base plate 10' is flat on both sides of the first bead BD1. Hereinafter the flat part toward the combustion chamber hole 1 from the first bead BD1 will be referred as the first flat part 10'A, and that away from the combustion chamber hole 1, as the second flat part 10'B.

The doubling plate 10" is used for adjusting the plate thickness of the gasket 10 according to the distance between joining faces among other purposes, and is substantially the same as the base plates 10' in shape. It has combustion chamber holes 1 and bolt holes 2 bored in positions corresponding in the stacking direction. In this embodiment, on the part of the doubling plate 10" to be stacked over the first flat part 10'A of the base plate 10', a second bead BD2 extends in the circumferential direction of the combustion chamber hole 1. This second bead BD2 is lower in bead height than the first bead BD1 formed on the base plate 10', and undergoes plastic deformation by the working of a load in the direction of the plate thickness according to the level of its facial pressure. Soft metal, less hard than the material of the base plate 10', such as a zinc-plated iron sheet, is used for the doubling plate 10" so that the second bead BD2 may permit plastic deformation. Its preferable hardness is about 200 or less in Vickers' hardness (HV). The second bead BD2 can be formed by pressing, such as embossing, as well as by forging. Pressing would be easier because it can be done under a lighter load than forging is.

The shim plate 11 is used for partially adjusting the plate thickness among other purposes. It is stacked in the area around the combustion chamber holes 1, where the first flat part 10'A and the first bead BD1 of the base plate 10' are formed in this embodiment, and partly fitted to the doubling plate 10" by caulking. The shim plate 11 is folded back all around the edge of the combustion chamber holes 1 to form the thickened part 11A, which is thicker than other parts. Therefore, the thickened part 11A of the shim plate 11 and the part of the doubling plate 10" where the second bead BD2 is formed are stacked over the first flat part 10'A; the flat part of the shim plate 11 and the doubling plate 10" are stacked in the position where the first bead BD1 is formed; and only the doubling plate 10" is stacked over the second flat part 10'B. As a result, the total plate thickness of the gasket 10 (in the illustration, the plate thickness of the base plate 10'+ that of the doubling plates 10" and 10"+ that of the shim plate 11 where it is stacked) is the greatest on the circumferences of the combustion chamber holes 1, from where it decreases stepwise toward the outside.

(Actions and Effects)

Next, the actions and effects of the gasket 10 of the above-described configuration will be described.

The gasket 10 of the above-described configuration is fitted, with fastening bolts piercing the bolt holes 2, between the joining faces of each pair of the cylinder block and the cylinder head constituting an engine.

Then, the first bead BD1 is deformed by being compressed to the height of the gap formed in the direction of plate thickness by the difference in plate thickness between the thickened part 11A and the flat part of the shim plate 11, and generates a sealing pressure by its elastic resilience to seal the gas pressure in the combustion chamber.

Along with that, the first flat part 10'A on the edge of each of the combustion chamber holes 1, where the total plate thickness is the greatest, receives concentrated bolt fastening load and generates a high enough facial pressure to seal the explosive combustion pressure in the combustion chamber hole. Then, as the total plate thickness is reduced stepwise, the facial pressure decreases stepwise from the first flat part 10'A to the formation position of the first bead BD1 and to the second flat part 10'B in that order, and therefore the deformation of the joining faces due to an excessive increase in facial pressure close to the combustion chamber can be avoided.

Further in this embodiment, as the second bead BD2 is subjected to plastic deformation according to the magnitude of the fastening load as it is compressed by the first flat part 10'A of the base plate 10' when it is fastened, its height is correspondingly reduced. As a result, in the peripheries of any combustion chamber hole 1, the load during fastening is greater in the vicinities of bolt holes 2, for instance, than in parts away from the bolt holes 2, and therefore the height is reduced as much as the extent of the deformation of the second bead BD2. As the fastening load is dispersed where the height is less, the facial pressure on the peripheries of combustion chamber hole 1 is uniformized after the fastening (after the plastic deformation of the second bead BD2). For this reason, not only can a satisfactory sealing function be achieved but also is it made possible to secure the circularity of the combustion chamber and prevent the joining faces from being deformed.

In this respect, if it is supposed for instance that the second bead BD2 does not undergo plastic deformation but is only elastically deformed like the ordinary first bead BD1, though it undergoes compressive deformation according to the fastening load, the extent of deformation increases with the magnitude of the loads, resulting conversely in a high elastic resilience, and accordingly the object of uniformizing the facial pressure cannot be achieved.

Also, as the variation (up and down) of the height of the above-described second bead BD2 automatically occurs according to the actual fastening load, the repetitive adjusting work can be reduced and the efficiency of designing improved, compared with providing in advance plate thickness differences along the peripheries of the combustion chamber holes 1. Furthermore, since the second bead BD2 can be formed by pressing, it can be machined more easily than by forging, resulting in a broader range of applicability. Also, as the second bead BD2 can be easily deformed, the metal mold need not be so precise, which is an advantage in the accuracy of manufacturing equipment and in cost.

(Modified Versions)

Although the invention made by the present inventors has been hitherto described with reference to a preferred embodiment thereof, the invention is not limited to this embodiment, but various modifications are possible without deviating from its true spirit and scope.

Figure 3:
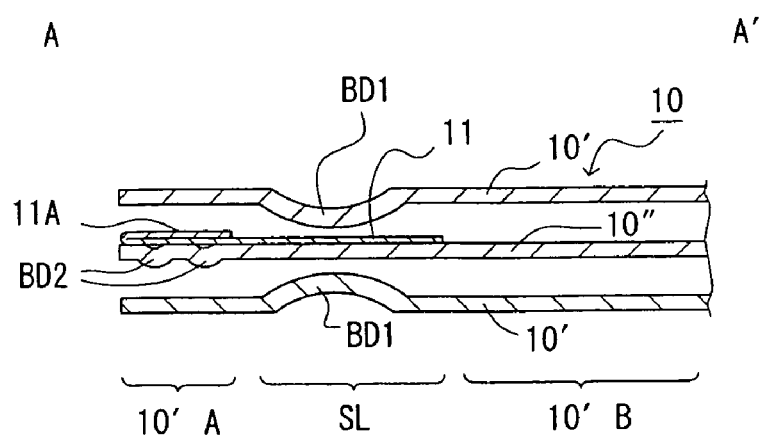
FIG. 3 shows a section of another gasket according to the invention (part of a section along line A-A' in FIG. 1A)

For instance, the second bead BD2 is not limited to the formation of only one line as shown in FIG. 2, but two or more lines second beads BD2 permitting plastic deformation can as well be formed in the position where the first flat part 10'A is to be stacked as shown in FIG. 3. In this way, even where the first flat part 10'A is wide, the facial pressure can be uniformized all over the widthwise direction. In this case, the two lines need not be equal in width and height, but the one farther from the combustion chamber holes 1 can be less in bead height, for example.

Figure 4:
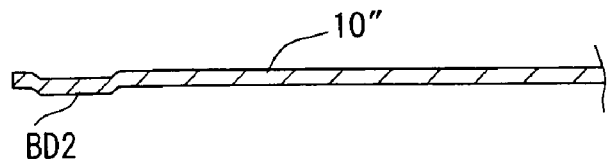
FIG. 4 shows a section of a doubling plate according to the invention over which another second bead is formed (part of a section along line A-A' in FIG. 1A)

Also, the shape of the second bead BD2 is not limited to the arch form as in the above-described embodiment, but the convex of the bead may as well be flat for instance, as shown in FIG. 4, or be convex on both sides in the direction of the plate thickness instead of being convex on only one side.

Figure 5:
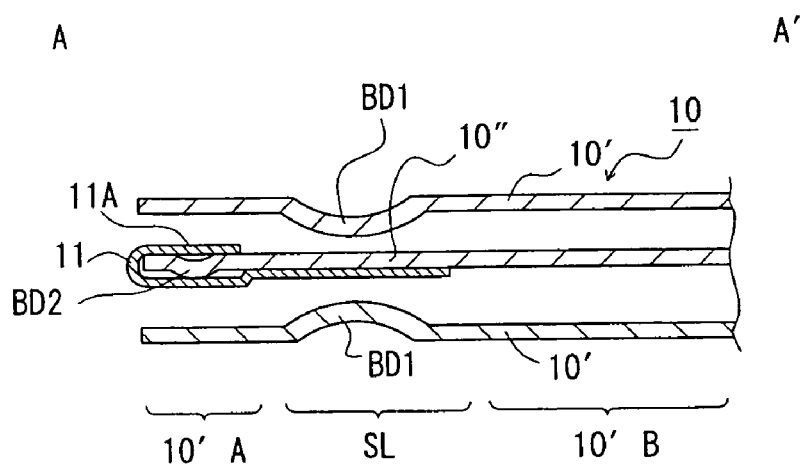
FIG. 5 shows a section of still another gasket according to the invention (part of a section along line A-A' in FIG. 1A)
Figure 8:
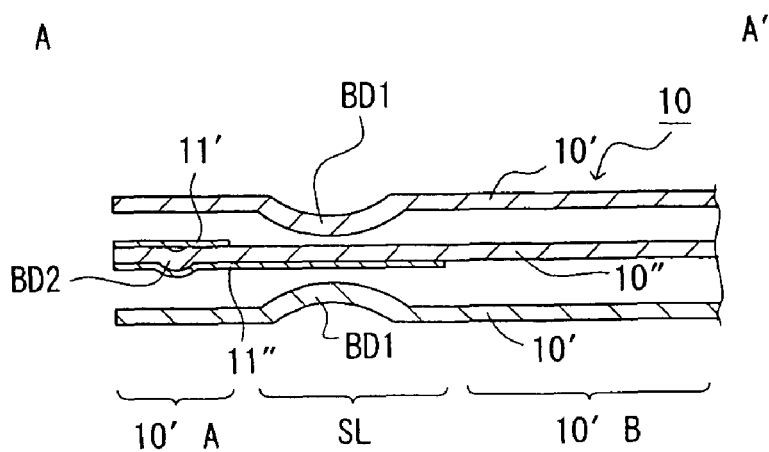
FIG. 8 shows a section of still another gasket according to the invention (part of a section along line A-A' in FIG. 1A)
Figure 9:
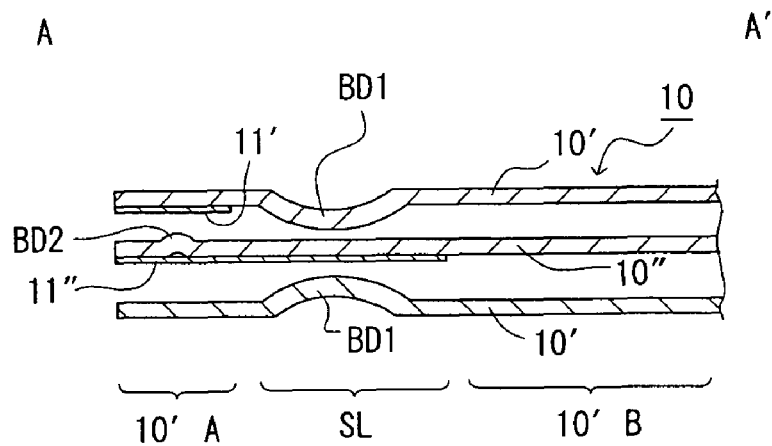
FIG. 9 shows a section of still another gasket according to the invention (part of a section along line A-A' in FIG. 1A).
Figure 10:
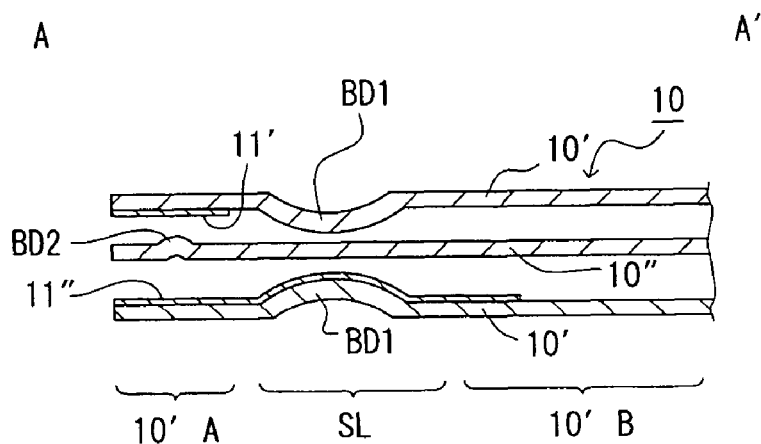
FIG. 10 shows a section of still another gasket according to the invention (part of a section along line A-A' in FIG. 1A)
Figure 11:
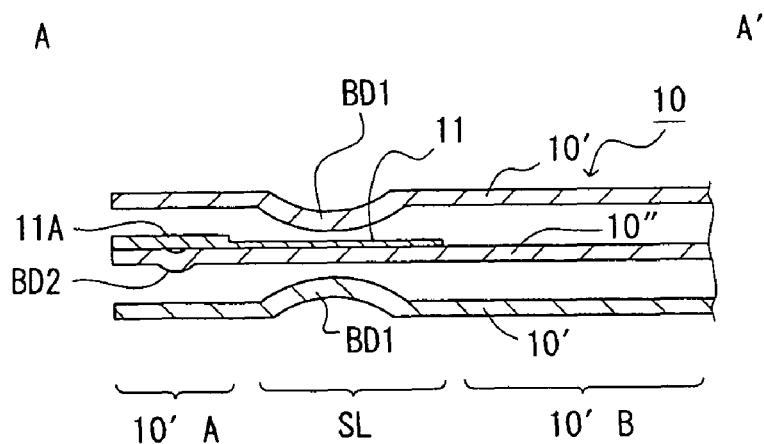
FIG. 11 shows a section of still another gasket according to the invention (part of a section along line A-A' in FIG. 1A).

Further, the thickened part 11A need not be formed always by folding back an edge of the shim plate 11, but by superposing one over another a plurality of metal sheets, either different or equal in plate thickness, by deposition or caulking. Case in which the total plate thickness is maximized in the position of the first flat part 10'A by using a plurality of shim plates are shown in FIG. 8 through FIG. 10. FIG. 8 shows two shim plates 11' and 11" different in shape are fitted to the two faces of the doubling plate 10". Of the two, one shim plate 11" is stacked in the position where the first flat part 10'A and the first bead BD1 are formed, while the other shim plate 11' is stacked in the position of the first flat part 10'A. This arrangement maximizes the total plate thickness in the position of the first flat part 10'A. The invention is applicable not only to cases in which the shim plate or plates are fitted to the doubling plate 10", but the total plate thickness can as well be maximized in the position of the first flat part 10'A by fitting the shim plate or plates to the base plate 10' and the doubling plate 10" (FIG. 9) or to the mutually opposite faces of the base plates 10' and 10' (FIG. 10). Further, the invention is applicable not only to cases in a plurality of shim plates are stacked, but also the total plate thickness can be maximized in the position of the first flat part 10'A by varying the plate thickness of a single shim plate 11 as shown in FIG. 11. The shim plate 11 shown in FIG. 11 can be formed, for instance, by depositing metal or by forge-pressing in the position where the first flat part 10'A is stacked. Incidentally, the total plate thickness in the position of the first flat part 10'A can be increased not only by adjusting it with the plate thickness of the shim plate as shown in FIG. 11 but also by partially increasing the doubling plate's and/or the base plate's own thickness. Or as shown in FIG. 5, the thickened part 11A can as well be formed by so folding back the shim plate 11 as to sandwich the second bead BD2 of the doubling plate 10" from above and below.

Figure 6:
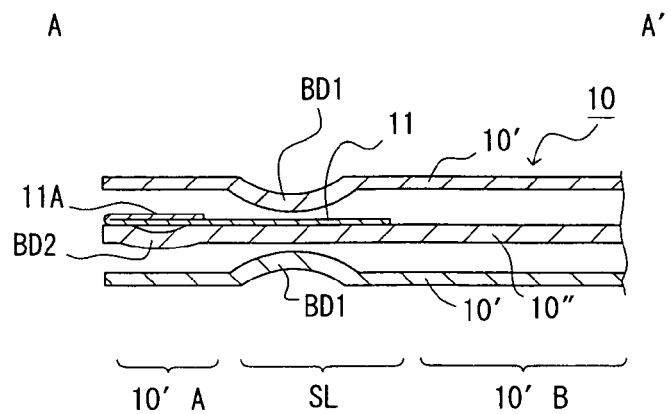
FIG. 6 shows a section of still another gasket according to the invention (part of a section along line A-A' in FIG. 1A)

The width and bead height of the second bead BD2 may be uniform all over in the extending direction of the bead, but the rigidity of the second bead BD2 could be varied by adjusting its width and/or bead height. FIG. 6 shows an example of second bead BD2 increased in width. For instance, in the vicinities of bolt holes 2 where the fastening load is greater, the rigidity of the bead can be reduced to facilitate plastic deformation by making the bead width greater and the bead height smaller than areas farther from the bolt holes 2, and accordingly the load can be reduced more easily. On the other hand, in areas away from bolt holes 2, since the second bead BD2 is more difficult to be crushed, the bead height can be maintained and so can be the magnitude of the fastening load, resulting in uniformization of the facial pressure.

Figure 7:
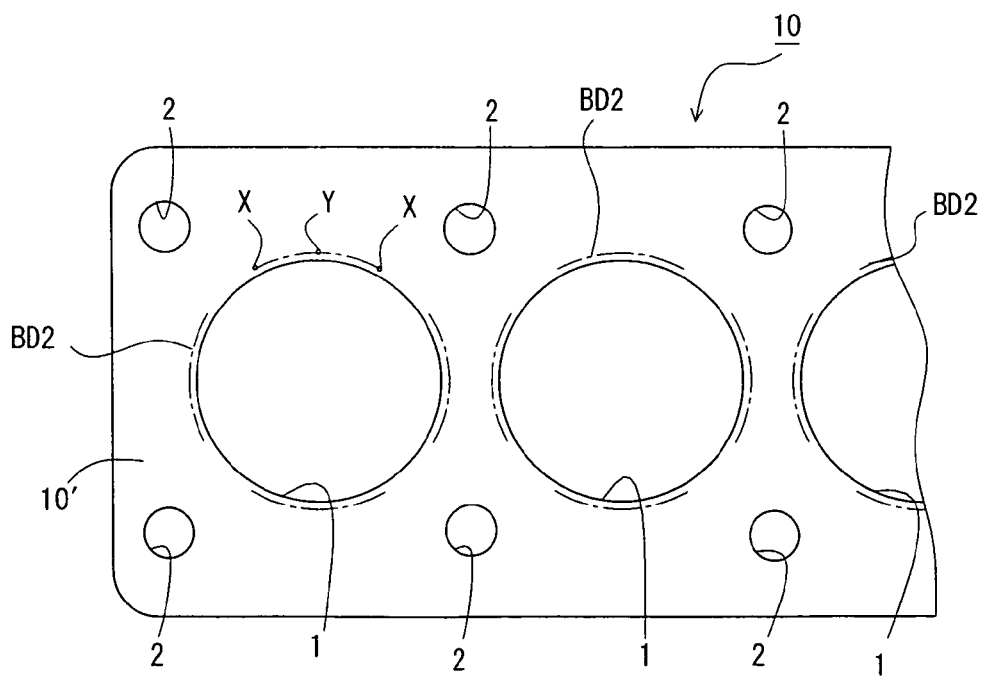
FIG. 7 is a plan illustrating a gasket according to the invention in which the second bead is arranged in another manner.

Further, the second bead BD2 need not be formed all around the combustion chamber hole 1 as in the embodiment described above, but may as well be formed only partly in the circumferential direction as shown in FIG. 7. FIG. 7 is a plan illustrating the gasket 10, wherein the second beads BD2 are represented by one-point chain lines for better illustration of the positions of their formation. In the example of FIG. 7, the second beads BD2 are formed only in areas away from bolt holes 2, and the doubling plate 10" is kept flat, instead of forming any second bead BD2, in the vicinities of the bolt holes 2. Thus, the vicinities of the bolt holes 2 are in such a state that from the outset the second beads BD2 are subjected to plastic deformation until they are fully bent. Further in the case shown in FIG. 7, the bead height of the same second bead BD2 is gradually increased, while the bead width is reduced, from the vicinities of bolt holes 2 toward areas away from the bolt holes 2 (from the areas denoted by points X toward the area denoted by point Y in the illustration). This disposition better serves to uniformize the facial pressure, and compatible with greater differences in fastening load.

Incidentally, the present invention imposes no particular limitation to the shape or constitution of the first bead BD1. The invention is applicable not only where metal beads alone are formed along the seal line SL as in the embodiment described above, but also where synthetic beads comprising metal beads and elastic seals that can be deformed by compression in the direction of the plate thickness are to be formed along the seal line SL.

What is claimed is:

1. A gasket comprising:
   a pair of base plates stacked one over the other, in each of which combustion chamber holes are bored and a first bead is disposed surrounding each of the combustion chamber holes, wherein in each of said base plates, a flat part on said combustion chamber hole side relative to the position where said first bead is formed refers to a first flat part and a flat part away from said combustion chamber hole relative to said first bead refers to a second flat part;
   a doubling plate stacked between said pair of base plates and having at least one deformable second bead disposed surrounding each of the combustion chamber holes, the at least one deformable second bead having a curved shape and being positioned between the combustion chamber hole and the first bead, wherein the doubling plate and each of the pair of base plates have substantially a same thickness; and
   a shim plate stacked on the doubling plate and extending between a first end and a second end, wherein the first end of the shim plate is positioned proximate the second flat part, the shim plate extending to the combustion chamber hole, where the shim plate is folded back such that the second end is positioned between the second bead and the first bead along the first flat part.

2. The gasket according to claim 1, wherein the doubling plate is formed of a material not harder than said base plates.

3. The gasket according to claim 1, wherein at least a width or the height of said second bead is varied in a direction of an extension thereof.

4. The gasket according to claim 1 wherein bolt holes through which fastening bolts are inserted are formed in said base plates, and said second bead is not formed in vicinities of said bolt holes but formed only in positions away from said bolt holes.

5. The gasket according to claim 1, wherein the at least one deformable second bead is two deformable second beads.

6. The gasket according to claim 1, wherein a total plate thickness combining a plate thickness of said base plate, a thickness of said doubling plate and a thickness of said shim plate is maximized around the combustion chamber holes in the area in which the shim plate is folded back.

7. The gasket according to claim 2, wherein a total plate thickness combining a plate thickness of said base plate, a thickness of said doubling plate and a thickness of said shim plate is maximized around the combustion chamber holes in the area in which the shim plate is folded back.

8. The gasket according to claim 1, wherein the first beads have a first height and the second bead has a second height, the first height being greater than the second height.

9. The gasket according to claim 1, wherein the shim plate comprises a first shim plate stacked between one of the pair of base plate and the doubling plate and, a second shim plate, the second shim plate being a folded back portion, wherein the second shim plate is between the other one of the pair of base plates and the doubling plate opposite the first shim plate, the second shim plate being planar and positioned to span the second bead but not the first bead.

10. The gasket according to claim 9, wherein the second shim plate is planar and positioned on a side of the doubling plate opposite the second bead.

* * * * *